United States Patent
Starossek

(10) Patent No.: US 9,169,894 B2
(45) Date of Patent: Oct. 27, 2015

(54) DEVICE FOR VIBRATION CONTROL OF A STRUCTURE

(75) Inventor: Uwe Starossek, Hamburg (DE)

(73) Assignee: SOLETANCHE FREYSSINET, Rueil Malmaison (FR)

( * ) Notice: Subject to any disclaimer, the term of this patent is extended or adjusted under 35 U.S.C. 154(b) by 1097 days.

(21) Appl. No.: 12/448,205

(22) PCT Filed: Dec. 13, 2007

(86) PCT No.: PCT/EP2007/010953
§ 371 (c)(1),
(2), (4) Date: Jan. 4, 2010

(87) PCT Pub. No.: WO2008/071428
PCT Pub. Date: Jun. 19, 2008

(65) Prior Publication Data
US 2010/0107807 A1   May 6, 2010

(30) Foreign Application Priority Data
Dec. 15, 2006 (DE) .......................... 10 2006 059 189

(51) Int. Cl.
*F16F 7/10* (2006.01)
*F16F 15/22* (2006.01)
*F16F 15/02* (2006.01)

(52) U.S. Cl.
CPC .............. *F16F 15/223* (2013.01); *F16F 15/02* (2013.01); *Y10T 74/2111* (2015.01)

(58) Field of Classification Search
CPC ................................ F16F 15/22; F16F 15/223
USPC ................ 188/378, 379, 380; 267/136; 74/61
See application file for complete search history.

(56) References Cited

U.S. PATENT DOCUMENTS

| | | | | |
|---|---|---|---|---|
| 4,972,930 A | * | 11/1990 | Davis | 188/379 |
| 5,213,184 A | * | 5/1993 | Legouis et al. | 188/378 |
| 5,347,884 A | * | 9/1994 | Garnjost et al. | 74/570.2 |
| 5,825,663 A | * | 10/1998 | Barba et al. | 702/41 |
| 5,903,077 A | * | 5/1999 | Garnjost et al. | 310/81 |
| 6,212,445 B1 | * | 4/2001 | Barba et al. | 700/280 |

(Continued)

FOREIGN PATENT DOCUMENTS

| | | |
|---|---|---|
| DE | 101 30 643 | 1/2003 |
| DE | 10 2004 025 761 | 12/2005 |
| EP | 1 493 941 | 1/2005 |
| FR | 2 845 744 | 4/2004 |

(Continued)

*Primary Examiner* — Nicholas J Lane
(74) *Attorney, Agent, or Firm* — Dentons US LLP

(57) ABSTRACT

The invention relates to a device for vibration control of a structure having—two mass bodies (10, 20), each of which is rotatably mounted around a rotational axis (12, 22), wherein both rotational axes extend in the same direction and the center of gravity of each mass body has a spacing ($r_1, r_2$) from the associated rotational axis,—a drive that sets each mass body (10, 20) in a circulating rotational motion,—at least one sensor (40), which measures a movement or acceleration of the structure (30), and—a control that, based on the measured movement or acceleration, controls at least one of the following variables:—the rotational angle ($\phi_1, \phi_2$) of the rotational movement of at least one mass body (10, 20),—the spacing (a) between the rotational axis (12) of one mass body (10) and the rotational axis (22) of the other mass body (20).

22 Claims, 6 Drawing Sheets

(56) References Cited

U.S. PATENT DOCUMENTS

Figure 1:
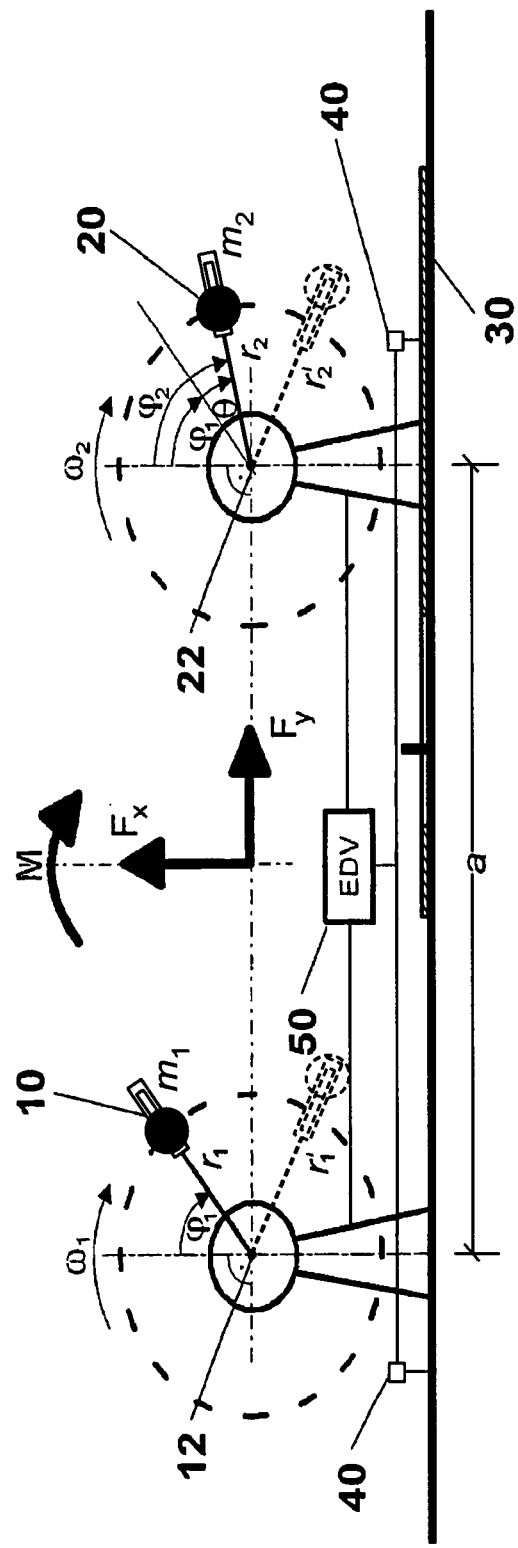

| | | | |
|---|---|---|---|
| 7,132,817 B2 * | 11/2006 | Noe | 322/29 |
| 8,090,482 B2 * | 1/2012 | Jolly et al. | 701/3 |
| 8,162,606 B2 * | 4/2012 | Jolly et al. | 416/1 |
| 2005/0201863 A1 * | 9/2005 | Welsh et al. | 416/170 R |
| 2009/0254230 A1 * | 10/2009 | Jolly et al. | 701/3 |
| 2010/0012768 A1 * | 1/2010 | Jolly | 244/17.13 |

FOREIGN PATENT DOCUMENTS

| | | |
|---|---|---|
| FR | 2 852 648 | 9/2004 |
| JP | 60-237239 | 11/1985 |
| JP | 02-096064 | 4/1990 |
| JP | 06-147258 | 5/1994 |
| JP | 2000-120764 | 4/2000 |

* cited by examiner

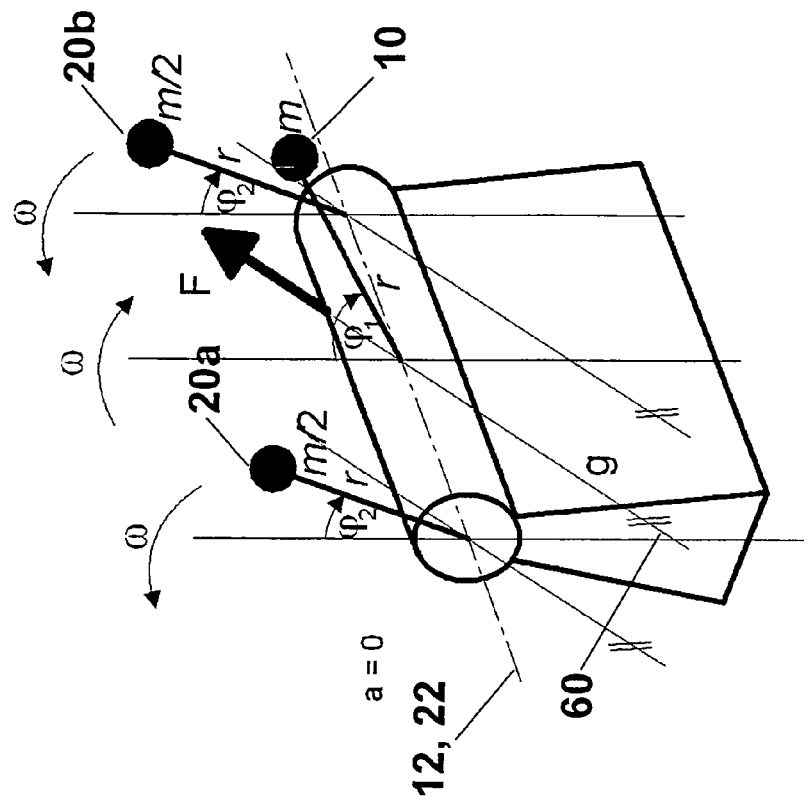
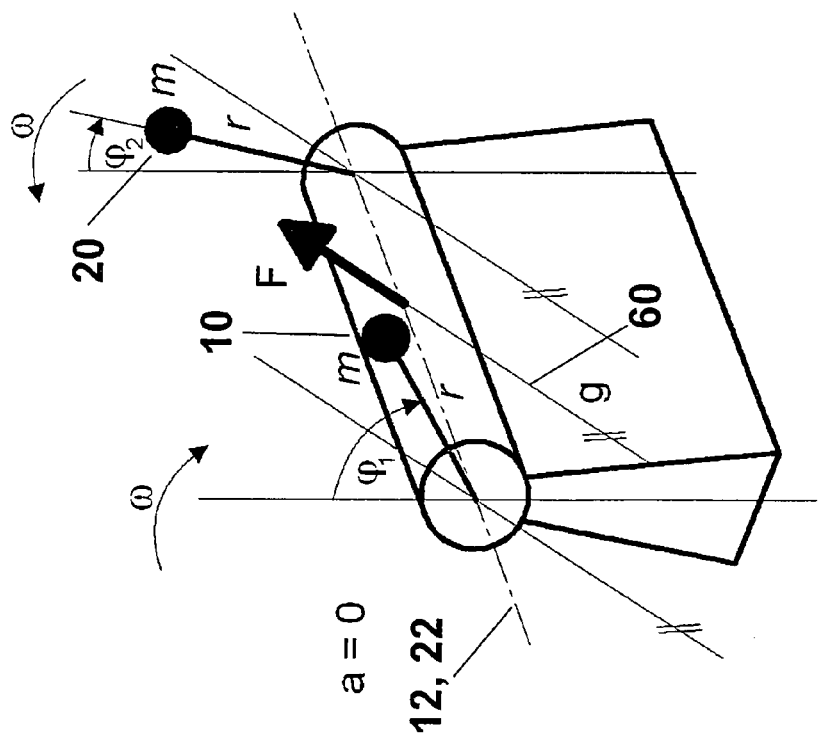
Fig. 4
Fig. 3

DEVICE FOR VIBRATION CONTROL OF A STRUCTURE

This application is a 35 U.S.C. §371 National Stage entry of International Application No. PCT/EP2007/010953, filed on Dec. 13, 2007, and claims the benefit of German Patent Application No. 10-2006-059-189.5, filed on Dec. 15, 2006, both of which are hereby incorporated by reference in their entireties.

Building constructions, land and water vehicles, aircraft and spacecraft, as well as other machines, devices, and equipment, which are generally referred to in the following as structures, are caused to vibrate by dynamically acting forces that can impair operability, durability, and structural and operational stability. The possibility and effects of such vibrations should be analyzed as part of the structural design. The vibrations should, if necessary, be suppressed or limited by taking appropriate measures. One possible measure is the reinforcement of the structure, which, however, entails more materials, greater weight, and higher costs.

Passive or active control systems, which introduce additional forces into the structure that counteract the vibrations and thus reduce the impact of the vibrations, can be a sensible and economical alternative. In the case of the so-called active mechanical damper, these additional forces are generally generated by the shifting or acceleration of auxiliary masses. With this targeted control action, shifting or accelerating the auxiliary masses are manipulated variables that must be calculated and adjusted, depending upon the system parameters, the measured movement of the structure, and perhaps the measured environmental conditions (closed-loop control). These types of systems are already being used for high-rise buildings in earthquake areas (see Housner, G. W.; Bergmann, L. A.; Caughey, T. K.; Chassiakos, A. G.; Claus, R. O.; Masri, S. F.; Skelton, R. E.; Soong, T. T.; Spencer, B. F.; Yao, J. T. P. "Structural Control: Past, Present, and Future", Journal of Engineering Mechanics, 9 (123), 1997, 897-971).

The requirements placed on vibration control devices are numerous and, to some degree, counteract the design consequences. On the one hand, the forces generated by the control system should be as adjustable as possible with respect to time and space. On the other hand, the design principle should be as simple as possible, in the interest of greater operational safety and lower construction costs. Other criteria include an extremely robust closed-loop control and the lowest possible energy requirement.

A device for damping an oscillation in a supporting structure, which has a pair of pivotally mounted mass bodies arranged on opposite sides of an axis, is known from WO 2005/116340 A1. A drive moves the mass bodies around a predetermined angle on a plane perpendicular to the axis, according to the specification of a control unit that reacts to measured values of the position and/or movement of the supporting structure. The pivoting movement is hereby limited to a certain angular range.

Known from WO 2006/029851A is a damping device for damping a vibration movement in which a pair of mass bodies are attached to both ends of a rotatably mounted beam and arranged on opposite sides of a rotational or swivel axis of the beam, wherein the rotational or swiveling movement of the beam can be predetermined or influenced either actively by an actuator or passively by means of spring and/or damping elements. The relative arrangement of the two mass bodies is hereby predetermined by the beam.

A device for damping vibration is known from Patent Abstracts of Japan 06147258 A. The device comprises a gear wheel with internal cogging that meshes with the external cogging of a second gear wheel. The second gear wheel is half the diameter of the outer gear wheel and is equipped with a weight in the edge area. The second gear wheel is set in a rotational motion inside the outer gear wheel by means of a centrally arranged lever.

A device for damping vibrations, in which two opposing rotatable discs are equipped with eccentrically arranged smaller discs, is known from Patent Abstracts of Japan 2000120764 A. The smaller discs support a weight eccentrically. By adjusting the angular position of the smaller disc in relation to the larger disc, the spacing between the weight and the rotational axis can be adjusted.

A device for vibration control in tall buildings is known from Patent Abstracts of Japan 02096064 A. The device has two masses, each of which is rotatably mounted in the device by means of an arm. Provision is made for the length of the rotational arm to be controlled while the mass bodies rotate in opposite directions.

The task of the invention is to provide a device for vibration control of a structure in which the existing requirements are fulfilled in a more balanced and better way than is the case with known devices.

This task is fulfilled by a device for vibration control of a structure that has the characteristics of Claim 1. Advantageous embodiments are the subject matter of the dependent claims.

The device according to the invention for vibration control of a structure has
- two mass bodies, each of which is rotatably mounted around a rotational axis, wherein both rotational axes extend in the same direction and the center of gravity of each mass body has a spacing from the associated rotational axis,
- a drive that sets each mass body in a circulating rotational motion,
- at least one sensor, which measures a movement or acceleration of the structure, and
- a control that, based on the measured movement or acceleration of the structure, controls at least one of the following variables:
  - the rotational angle of the rotational movement of at least one mass body,
  - the spacing between the rotational axis of one mass body and the rotational axis of the other mass body.

The designation double unbalance rotor is coined and used here for the device according to the invention.

Each mass body creates an unbalanced state caused by the spacing between its center of gravity and the associated rotational axis. Both rotational axes extend in the same direction, i.e., they run parallel. They can be spaced apart from each other or arranged without a spacing, i.e., are coincident. The rotational direction of each mass body is initially discretionary. Both mass bodies perform a circulating rotational motion. Due to the centripedal forces, each of the mass bodies creating an unbalanced state hereby generates a temporally fluctuating force on its rotational axis.

The resulting forces generated by the two rotating mass bodies, which are exerted by the device for vibration control, are hereby dependent upon the construction of the device. Of decisive importance, in particular, are the sizes of the two masses, the rotational speeds of the two mass bodies, a phase relation between the two rotational motions (with numerically identical speeds), and the spacing between the rotational axis of one mass body and the rotational axis of the other mass body. The aforementioned influencing variables can hereby basically be either fixed or variable. By means of the control provided according to the invention of at least one of the applicable variables according to the text of Claim 1, a targeted influence of the resulting forces is achieved, in order to control, i.e., particularly to dampen, the vibration of a structure that is connected to the device. By means of an appropriate control, both a torque acting in the direction of the rotational axes (i.e., a torque moving in the axis direction) and a force acting perpendicular to the direction of the rotational axes are generated. The variation over time in the moment and force actions is dependent upon the aforementioned influencing variables and can be predetermined in numerous ways by the construction of the device and the control according to the invention. By means of the circulating rotational motion of the two mass bodies, and when the rotational speed is constant, periodic forces and torques can be generated, wherein the drive must merely maintain the rotational movement of the two mass bodies. The device is therefore particularly energy-efficient. In the case of non-constant rotational speeds, non-periodic moment and force actions can also be achieved.

In a preferred embodiment of the invention, a sensor is provided that measures an environmental condition. This can, for example, be a wind speed or ground acceleration, for example, in the case of an earthquake. Several sensors can also be used, which, if necessary, can measure different environmental conditions. Having the control of the device take such environmental conditions into account can contribute to an effective usage of the device. For example, the device can be put into operation only above a certain wind speed.

In a preferred embodiment of the invention, the rotational speeds of the two mass bodies are at an equally high level. This enables the device to be operated with a definite phase relation between the two rotating mass bodies. A harmonic force or moment action is achieved with the joint rotational speed of the two mass bodies.

In another preferred embodiment of the invention, the two mass bodies have the identical mass. With an appropriate arrangement of the two mass bodies, both rotating mass bodies attain the same level of unbalance in an especially simple way. In particular, with the appropriate control, individual components of the force action of one mass body can be compensated for by corresponding components of the force action of the other mass body, so that simple operation of the device is also possible without any resulting forces, force components, and/or torques.

In another preferred embodiment of the invention, the spacing between a mass body and its associated rotational axis is identical for both mass bodies. The spacing between the mass bodies and their respective rotational axes can hereby be fixed or variable. By combining mass bodies of identical mass and using identical spacing between the two mass bodies and their associated rotational axes, each mass body achieves the same level of unbalance.

According to another preferred embodiment of the invention, the spacing between the rotational axes associated with the two mass bodies is adjustable. By adjusting the spacing between the two rotational axes, the amplitude of a generated torque can be adjusted. The adjustability of the torque is hereby independent of any additionally generated force that might be necessary.

In another preferred embodiment of the invention, at least one of the two mass bodies comprises two partial mass bodies, which are spaced apart from each other in the direction of the rotational axes. The two partial mass bodies forming one mass body can preferably be of equal size and always unidirectional. In particular, the non-divided mass body between the two circulating partial mass bodies can be arranged on a common rotational axis, so that undesired moments do not occur around an axis that is vertically aligned to this common rotational axis.

In another preferred embodiment of the invention, the phase relations between the rotational movements of the two mass bodies can be adjusted by a mechanical coupling. This simplifies the control of the phase relations between the two mass bodies. In particular, a gear mechanism can be used by means of which the phase difference between the two circulating mass bodies can be predetermined.

According to another preferred embodiment of the invention, the rotational movements of the two mass bodies go in opposite directions. When the two mass bodies rotate in opposite directions, a direction along which a harmonic force acts can be defined by those points in the trajectory of movement where the angular position of the two mass bodies correspond. This direction can be determined by predetermining the phase relation between the two rotational movements.

According to another preferred embodiment of the invention, the rotational axes of both mass bodies are coincident. In this case, no torques occur. Thus, merely one force action is achieved.

In another preferred embodiment of the invention, the rotational movements of both mass bodies run in the same direction. Preferably, the phase angle between the two rotational movements is always 180°, i.e., the two mass bodies are always opposite each other. This allows a moment to be generated in the direction of the rotor axes without a simultaneous force action occurring.

In another preferred embodiment of the invention, the device is combined with a second device, wherein the rotational axes of the first and second devices extend in the same direction. All four rotational axes thus run parallel. The rotational axes can hereby be spaced apart from each other or can also be coincident. Combining two devices results in numerous options for simultaneously generating a force and a moment in the direction of the rotor axes. Depending upon the construction of the individual devices, the frequencies, amplitudes, and directions of force and moment can be adjusted especially easily. The construction of the individual devices can hereby be simplified and/or the required control costs reduced.

According to another preferred embodiment of the invention, the rotational speeds of the two mass bodies of both the first and second devices are numerically identical. Force and moment actions of the two devices then always result in harmonic forces and moments of identical frequency.

In another preferred embodiment of the invention, the two devices are spaced apart from each other. Preferably, this spacing between the two devices is adjustable. By means of this spacing, the amplitude of a moment jointly generated by the two devices can be adjusted.

In another preferred embodiment of the invention, the rotational axes of the mass bodies of the two devices are coincident. Expressed another way, the spacing between the two devices is zero. All four rotational axes are thus arranged on a straight line. This enables a particularly compact construction, as well as the generation of harmonic forces of any desired amplitude and in any direction perpendicular to the rotor axis. By presetting the phase angle of the two individual devices, the amplitude and direction of the force is especially easy to adjust.

In another preferred embodiment of the invention, two devices, each of which comprises two devices, are advantageously combined.

According to another preferred embodiment of the invention, the control, which determines the manipulated variables based on the measured values of at least one sensor and generates the control commands for the control, in order to control the movements of the accelerations of the structure, is constructed as a feedback control. This means that the control commands are constantly adjusted according to the temporal change in measured values and in line with the control task of either suppressing or limiting the vibrations. With this type of feedback control, a closed-loop control can be formed that dampens undesired movements or vibrations of the structure particularly effectively.

In another preferred embodiment of the invention, multiple devices are distributed over the structure. An effective vibration control can hereby be achieved especially for large structures, e.g., a bridge. The control or regulation of the individual devices is preferably coordinated. It is also possible, however, and can be advantageous, to control or regulate the devices autonomously, i.e., independently of each other.

Additionally, provision can be made for the spacing between at least one mass body and its associated rotational axis to be alterable and controllable during operation, and to control this spacing by a control based on the measured movement or acceleration.

Figure 2:
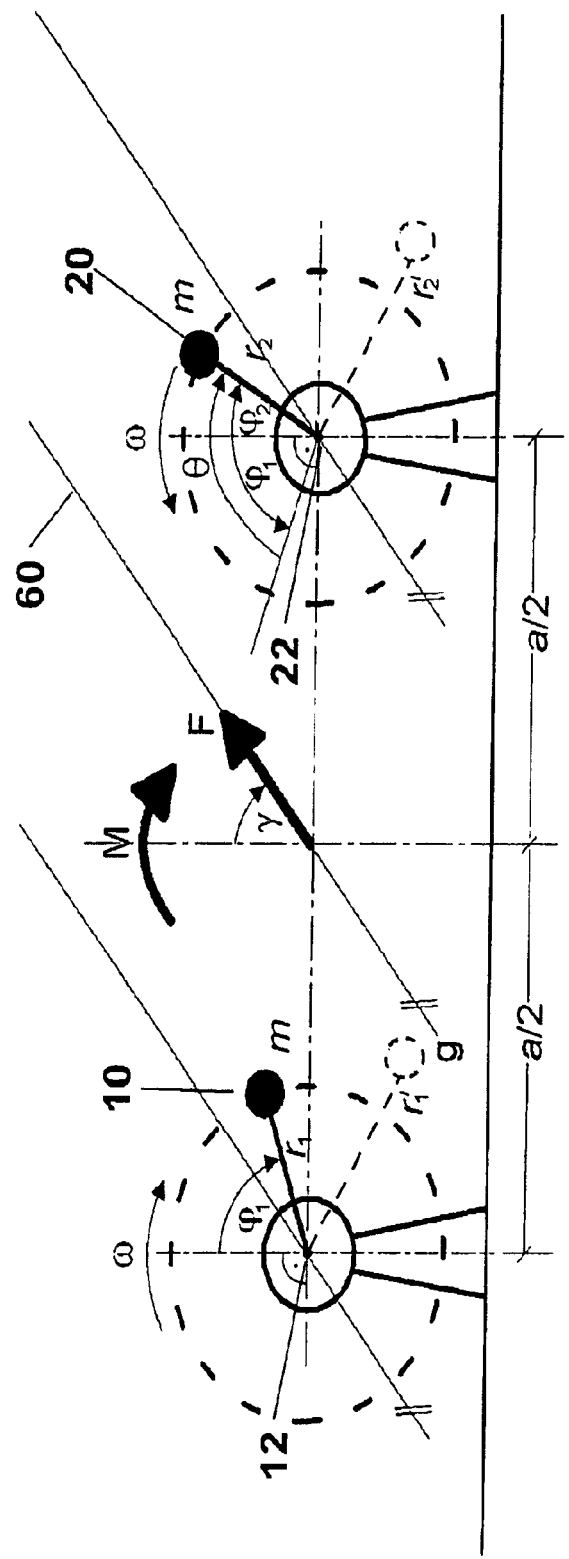
Figure 5:
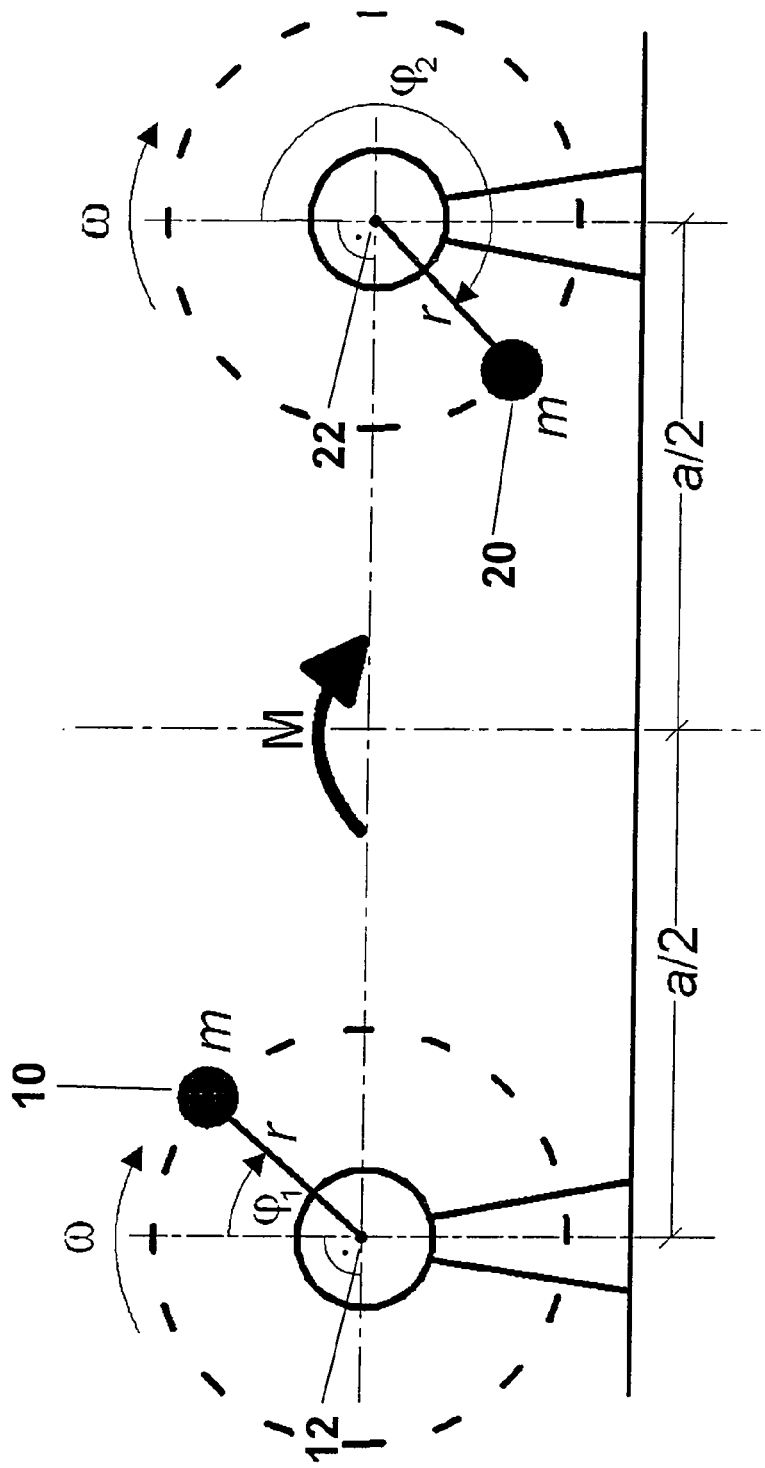
Figure 7:
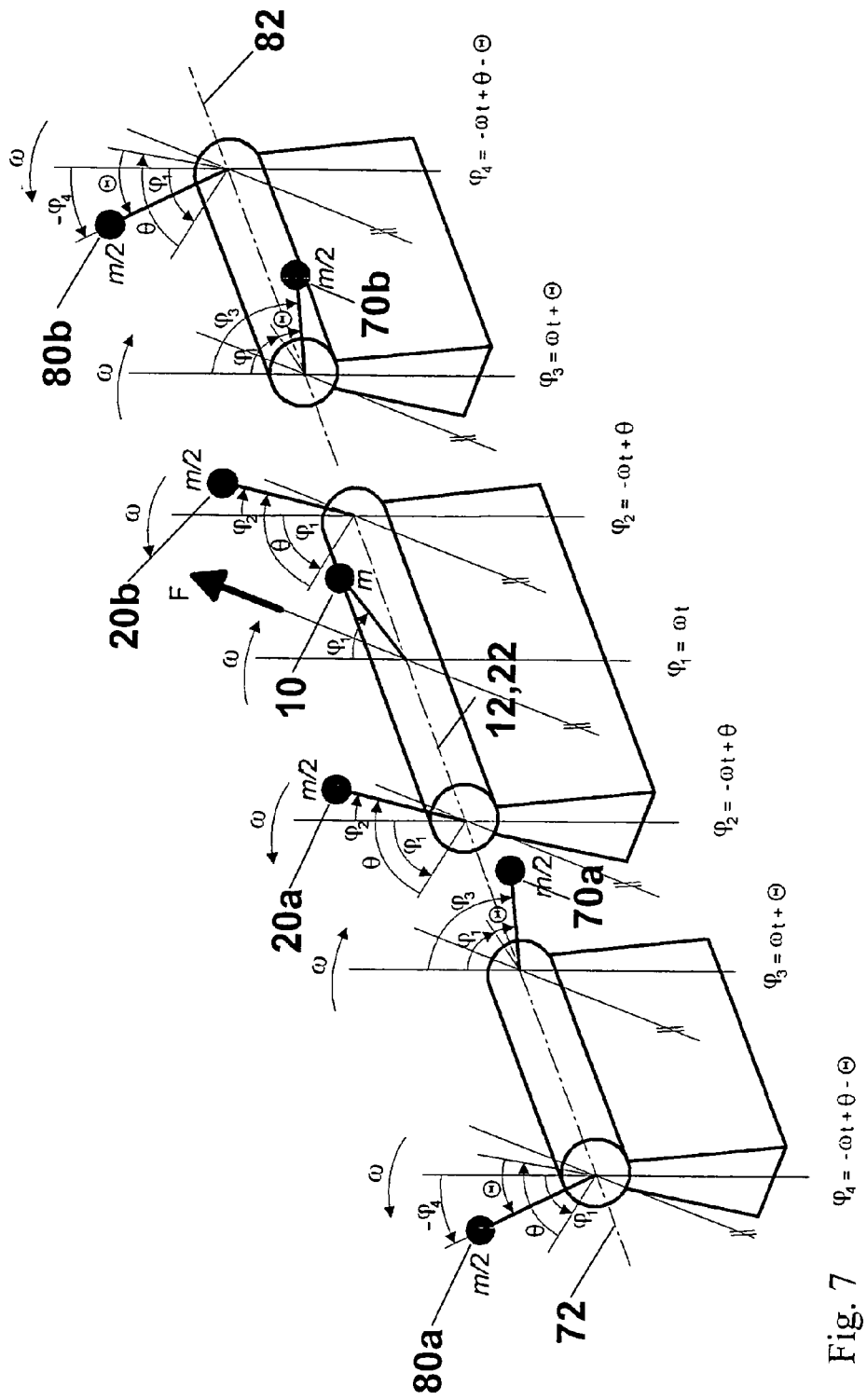

The invention is described below in more detail using embodiments presented in seven figures. Shown are:

FIG. 1 a schematic diagram of a double unbalance rotor according to the invention (basic principle);

FIG. 2 a schematic diagram of another embodiment of the invention with mass bodies rotating in opposite directions (Variant 1a);

FIG. 3 a schematic diagram of another embodiment of the invention with mass bodies rotating in opposite directions and coincident rotational axes (Variant 1b);

FIG. 4 a schematic diagram of another embodiment of the invention with one mass body formed by two partial mass bodies (Variant 1c);

FIG. 5 a schematic diagram of another embodiment of the invention with mass bodies rotating in the same direction (Variant 2a);

FIG. 6A schematic diagram of another embodiment of the invention with two combined double unbalance rotors (Variant 3);

FIG. 7A schematic diagram of another embodiment of the invention with two combined double unbalance rotors and coincident rotational axes, wherein each of three of the four unbalance masses is replaced by two equally sized partial masses (Variant 4c).

Each of the two mass bodies of a double unbalance rotor is formed by one unbalance mass. An unbalance mass with associated rotational axis is called the rotor. The double unbalance rotor and its embodiments are described with regard to their efficacy, and therefore restricted to the underlying mechanical principles and with the aid of elementary mechanical diagrams. The options of technical realization are manifold and not examined here individually.

The double unbalance rotor comprises two identically constructed rotors with rotating unbalance masses 10 ($m_1$) or 20 ($m_2$) (FIG. 1). The axes 12, 22 of the two rotors are arranged parallel and with a spacing, a, apart from each other. The unbalance masses 10, 20 rotate with the rotational speed $\omega_1$ or $\omega_2$. Within the framework of a closed-loop control, the rotational speeds $\omega_1$ and $\omega_2$, the phase relation $\theta$ between the rotational angles of the two unbalance masses 10, 20, the spacing, a, between the two rotor axes, and also the radii $r_1$ or $r_2$ of the two unbalance masses 10, 20 (see $r_1'$ and $r_2'$ in FIGS. 1 and 2) and the size of the two unbalanced states can vary as control variables. Another parameter that can be selected or adjusted by a feedback control in terms of a control variable is the rotational direction of the two rotors, wherein rotation in the same direction or in opposite directions is possible. The control variables are calculated based on measurements of the movement of structure 30 and, if necessary, the environmental conditions within the context of a closed-loop control and adjusted by servomotors, hydraulic adjusting devices, or other types of actuators. The coordination of the control variables to be adjusted on the two rotors can partially be performed using mechanical auxiliary devices. In special embodiments, individual control variables can be predetermined as constants or can be in a predetermined relation. In particular, the two rotational speeds can be numerically identical, so that $|\omega_1|=|\omega_2|=\omega$ applies. The double unbalance rotor is firmly attached to structure 30. To increase efficacy or achieve special effects, several devices can also be used in identical or different embodiments whose operation is coordinated or performed autonomously.

By means of the aforementioned device as single or multiple units, harmonic or non-harmonic forces can be generated more or less in any desirable direction, frequency, and amplitude and introduced into the structure 30. In the case of a single unit of the device, these forces consist of two vertically aligned forces $F_x$, $F_y$ in the plane perpendicular to the rotor axes 12, 22 and a moment M in the direction (i.e., around the) of the rotor axes 12, 22. By appropriate selection of the control variables described in the previous paragraph, these three forces can be generated separately or simultaneously. When generated simultaneously, the amplitude or size ratio of the affected forces can be adjusted over wide ranges. Harmonic forces of the frequency $\omega/2\pi$ are generated under the constant rotational speed $\omega$.

In the following, the symbols listed in FIG. 1 are used, which have the following meaning: $\phi_1$ is the rotational angle of the rotational movement of the first mass body in relation to a reference angular position (in FIG. 1, the direction perpendicular to the connecting line of the two rotational axes 12, 22); $\phi_2$ is the rotational angle of the rotational movement of the second mass body in relation to the same reference angular position; the relation between the two rotational angles is, if necessary, described by the mass $\theta$, named here as the phase angle; $\omega_1$ and $\omega_2$ denote the angular velocities of the two rotational movements. When angular velocities $\omega=|\omega_1|=|\omega_2|$ are numerically identical and constant with respect to time, the following relations apply: $\phi_1=\omega t$; $\phi_2=\omega t+\theta$ with rotation in the same direction, or $\phi_1=\omega t$; $\phi_2=-\omega t+\theta$ with rotation in opposite directions. When rotation is in the same direction, $\phi_2-\phi_1=\theta$ applies, wherein $\theta$ also represents a phase angle in conventional terminology. When rotation is in opposite directions, $\phi_2-\phi_1=-2\omega t+\theta$ applies, wherein the designation of $\theta$ selected here as the phase angle deviates from conventional terminology.

The forces introduced into structure 30 serve as the vibration control and, within the context of a closed-loop control, are the control variables to be determined. In the interest of higher control efficiency, non-harmonic, but periodic or also aperiodic, force progressions can be desirable. These can be generated by variable rotational speed $\omega$ (t). An approximately sawtooth-shaped force progression can be produced by a constant rotational speed $\omega$, on which a harmonic term $\Delta\omega \sin \omega t$ is superimposed. The following remarks refer to—in the interest of a more simple presentation—the operation with a constant rotational speed, wherein the operation with a variable rotational speed is also always possible and is the object of the invention.

In the embodiment (Variant 1a) shown in FIG. 2 of the device described above in a single unit, both unbalance masses 10, 20 are equal in size ($m_1=m_2=m$) and rotate in opposite directions. The movement is described by the terms $\phi_1=\omega t$; $\phi_2=-\omega t+\theta$. (FIGS. 2 to 7 do not show the elements of the closed-loop control shown in FIG. 1, such as, the sensor 40 and EDV 50; these elements are nevertheless present.) The two meeting points of the unbalance masses 10, 20—these are the two positions of the masses in which the angular positions of the rotors match—lie on a straight line 60 ($g$) that lies in a certain angle $\gamma=\theta/2$ perpendicular to the connecting line of the two rotor axes 12, 22. This angle is thus adjustable via the phase angle $\theta$. In this way, a harmonic force F can be generated in the direction of g, and a harmonic moment M can be generated in the direction of the rotor axes 12, 22. When the frequency is retained, the amplitudes of the forces can be adjusted by changing the radii $r_1$, $r_2$, wherein the simpler parameter $r_1=r_2$ is generally possible. If $\gamma$ is adjusted so that g lies perpendicular to the connecting line of the two rotor axes 12, 22 ($\gamma=0$), then if $r_1=r_2$, only one harmonic force F occurs in the direction of g. The size of the spacing a between the two rotor axes 12, 22 thus has no effect, so that—in the interest of achieving the most compact construction as possible—this spacing can be reduced to zero, i.e., the two axes can be arranged as coincident.

The mechanism of action of this device can be expanded by selecting a desired direction of the straight line 60 ($g$) (Variant 1b, FIG. 3; the relations $\phi_1=\omega t$; $\phi_1=-\omega t+\theta$ apply). With it, harmonic forces can be generated in this direction without simultaneous occurrence of a moment around the rotor axis. The force direction can be adjusted by predetermining the phase angle $\theta$. To avoid undesired moments around an axis perpendicular to the rotor axis, the centers of gravity of the two unbalance masses can be arranged without displacement in the direction of the rotor axis 12, 22 by depicting one of the unbalance masses 10, 20 by two equally sized, always unidirectional partial masses 20a, 20b, which are arranged at both sides of (in the direction of the rotor axis 12, 22), and with identical spacings to the other unbalance mass 10 (Variant 1c, FIG. 4; in turn, the relations $\phi_1=\omega t$; $\phi_2=-\omega t+\theta$ apply). The rotational angles of the unbalance masses 10, 20 and, if necessary, the partial unbalance masses 20a, 20b can advantageously be coordinated by a mechanical coupling, such as a gear mechanism. This applies to all embodiments described here.

In another embodiment of the device, in a single unit according to FIG. 5 (Variant 2a) equally sized unbalance masses 10, 20 rotate in the same direction and with an identical radius r. The phase shift amounts to $\theta=180°$, i.e., the two unbalance masses 10, 20 are always opposite each other. The movements follow the expressions $\phi_1=\omega t$; $\phi_2=-\omega t+180°$. This allows a harmonic moment M to be generated in the direction of the rotor axes 12, 22. The amplitude of the moment can be adjusted by changing the spacing a between the two rotor axes 12, 22 or, as previously, by changing the radii r of the two unbalance masses 10, 20 simultaneously and uniformly. If one of the unbalance masses 10, 20 is shown by two partial masses 20a, 20b that are of equal size and always unidirectional (Variant 2b, according to FIG. 4, but with varying spacing a), then also small values a to a=0 can be adjusted without having to deal with undesirable moments around an axis perpendicular to the rotor axis. In this way, the moment M can be reduced down to the amplitude value of zero, which can also be only temporarily necessary over the progression of the closed-loop control. The rotational angle of the unbalance masses can advantageously be coordinated by a gear mechanism.

Figure 6:
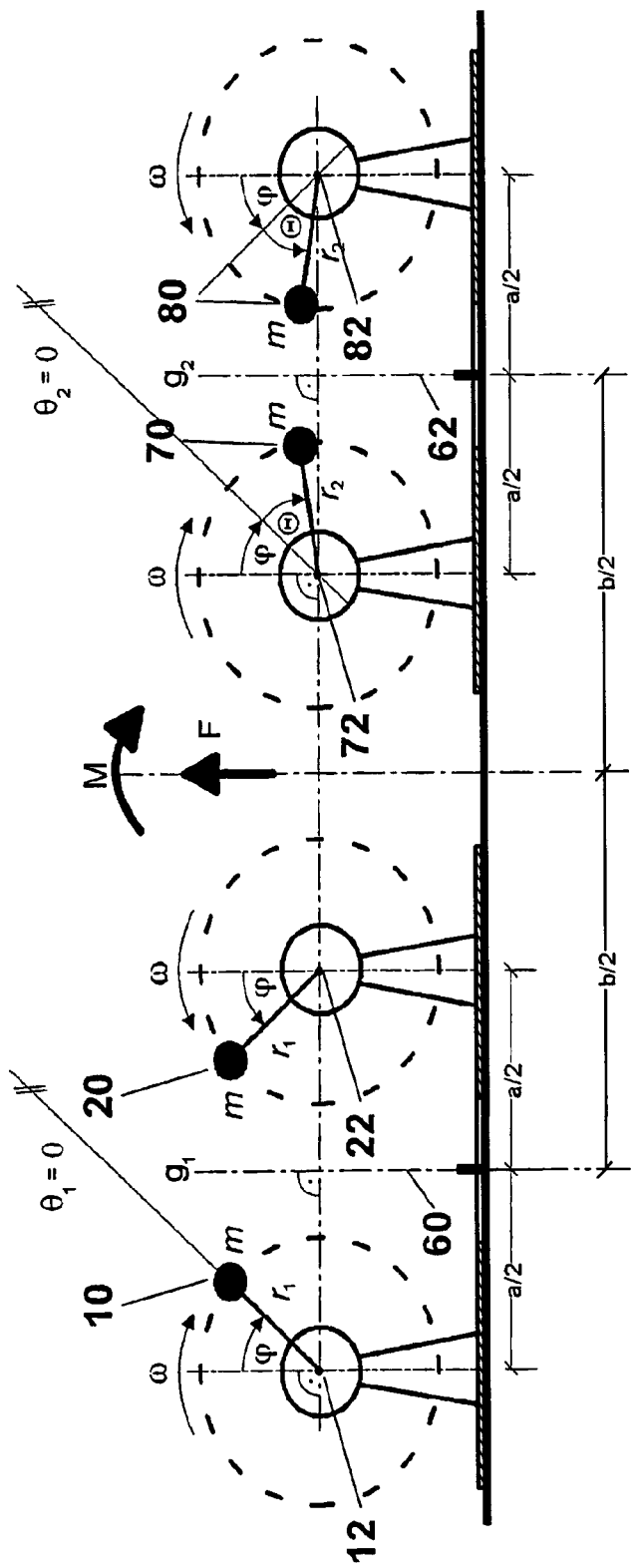

In another embodiment according to FIG. 6 (Variant 3), two devices of the same type according to FIG. 2 (Variant 1a) are arranged in such a way that both devices are spatially oriented and aligned identically. The unbalance masses 10, 20 or 70, 80 of both devices rotate at numerically identical speeds, and the phase angle within each of the two devices is adjusted in such a way that each device always produces only one harmonic force and no moment ($\theta_1=\theta_2=0$). The two straight lines 60, 62 ($g_1$, $g_2$) and, thus, the force directions are parallel to each other and perpendicular to the connecting line of the two associated rotor axes 12, 22 or 72, 82 ($\gamma_1=\gamma_2=0$). The two devices have a certain spacing b perpendicular to $g_1$, $g_2$. In this way, a harmonic force F in the direction of $g_1$, $g_2$ and a harmonic moment M having the same frequency in the direction of the rotor axes 12, 22, 72, 82 can be generated simultaneously. The amplitudes of force and moment, and the phase angle between these two forces, can be adjusted by changing the radii of the unbalance masses (10, 20 or 70, 80)—wherein the radii $r_1$, $r_2$ of the two devices are independent of each other, and the two radii of a device are generally to be adjusted identically—, of the phase angle $\Theta$ between the rotational angles of the unbalance masses 10, 20 and 70, 80 of both devices and of the spacing b of both devices.

Another embodiment (Variant 4a, not shown in a figure) corresponds to the double device according to Variant 3 (FIG. 6), wherein the spacing b is selected at zero. In this way, a harmonic force F can be generated without a moment M occurring. The amplitude of this force can be adjusted especially easily by changing the phase angle $\Phi$ between the rotational angles of the unbalance masses of both devices. Changing the radii of the unbalance masses is no longer required for this. The force F acts perpendicular to the connecting line of two associated rotor axes (if a≠0). If the two axes are always arranged coincident to a device (a=0), then all four axes can be arranged on one straight line (Variant 4b, not shown in a figure). This enables, on the one hand, a compact construction and, on the other hand, the generation of harmonic forces in a desired direction perpendicular to the rotor axis. The force direction can be adjusted by presetting the phase angles $\theta_1$ and $\theta_2$ of the two devices, wherein the same phase angle is to be adjusted for both devices ($\theta_1=\theta_2$). As previously the case, the amplitude of the force F can be adjusted by changing the phase angle $\Theta$. To avoid moments around an axis perpendicular to the rotor axis 12, 22, 72, 82, the centers of gravity of all unbalance masses can be arranged without displacement in the direction of the rotor axis by always showing three of the four unbalance masses as two equally sized unidirectional partial masses 20a, 20b, 70a, 70b, 80a, 80b that are always arranged at both sides (in the direction of the rotor axis), and with identical spacing to, the undivided unbalance mass 10 (Variant 4c, shown in FIG. 7).

In another embodiment (Variant 5, not shown in a figure), two devices of the same type according to Variant 4a, 4b, or 4c are combined analogously and used like Variant 3, which is derived from Variant 1a. In this way, on the other hand, a harmonic force perpendicular to the rotor axes and a harmonic moment M with the same frequency in the direction of the rotor axes can be generated. Instead of changing the radii of the unbalance masses, as required in Variant 3 (FIG. 6) for adjusting the amplitudes and phase angles of force and moment, the phase angles $\Phi_1$, $\Phi_2$ of the two devices change according to Variants 4a, 4b, or 4c.

In another embodiment (Variant 6, not shown in a figure), the described device is combined in any number of ways as single or multiple units or in one or several of the Variants 1 to 5, wherein forces of a different type and frequency are generated each time. By combining a Variant 1 (Variant 1a according to FIG. 2, adjusted in such a way that only one force, and no moment, is generated, or Variant 1b of 1C) and a Variant 2, e.g., a harmonic force and a harmonic moment can be generated independent of each other, i.e., with an amplitude, a frequency, and a phase relation that can always be adjusted in any number of ways. Both devices can be integrated into a common closed-loop control or, independent of each other, into separate closed-loop controls. The latter option of an autonomous operation leads to a simplification of the feedback control task. The closed-loop control for generating forces could, e.g., be restricted to measuring shifts, and the closed-loop control for generating moments, to measuring rotations. Such embodiments are advantageous when several vibration modes to be damped occur simultaneously with different frequencies, wherein for each vibration mode also several devices can be combined in different embodiments.

In another embodiment (Variant 7, not shown in a figure), the described device, as single or multiple units, or in one or several of the Variants 1 to 6, is housed in a container that is firmly, though detachably, connected to the structure. Advantageous here are the options for converting the container and, thus, for adapting to different construction, operational, and stress conditions, and for reusing in other structures. For applications in which relatively large unbalance masses are to be used (buildings and structures, water vehicles), a 20' or 40' standard container can be provided as the container. Additional advantages resulting from this are the simple and economical assembly and the logistics (transport, storage). Several containers can be used; the operation of the devices housed in various containers can be coordinated or performed autonomously.

The described device as single or multiple units, or in one or several of the Variants 1 to 7, can be used for controlling vibrations in building constructions, land and water vehicles, aircraft and spacecraft, or other machines, devices, and equipment. A possible application in the construction industry is the suppression or limitation of vibrations caused by earthquakes, wind, or traffic, thus ensuring structural stability, durability, and operability. Examples include the risk to the structural stability of long-span bridges caused by motion-induced aircraft, which cause flexural-torsional oscillations that can occur during construction and under final state conditions. A bridge being built using the cantilever method, which has a large overhang, such as that particularly occurring in cable-stayed bridges under construction, and also as a result of wind gusts, can experience vibrations that occur as vertical, transversal, or torsional vibrations and that compromise the structural stability or the construction process. Another application example in construction industry is the limitation of horizontal or torsional vibrations in high-rise buildings and towers, which can be caused by earthquakes or wind.

The translational vibrations occurring in the aforementioned examples can be advantageously suppressed by devices according to Variants 1, 3, or 4, wherein the devices and their parts are aligned in such a way and the phase angles adjusted in such a way that the generated forces run parallel to the translational directions and counteract the translational vibrations. Torsional vibrations can advantageously be suppressed by a device according to Variants 2, 3, or 5, wherein the device and its parts are aligned in such a way that the generated moment counteracts the torsional vibration—the rotor axes in a bridge are therefore oriented in the longitudinal direction of a bridge, and in a high-rise building or tower, they are vertically oriented—and, where necessary, the phase angles are adjusted in such a way that no acting force occurs simultaneously. In the case of combined translational and torsional vibrations, devices according to Variants 1, 3, 5, or 6 are effective alone or combined with Variants 2 or 4. Amplitude, frequency, and phase of the generated forces and moments are calculated and adjusted within the context of the closed-loop control or closed-loop controls based on the measured movement of the structure and possibly the measured environmental conditions (for earthquakes, e.g., the ground acceleration at the site and the environment of the site). In the simplest case (harmonic vibration as pure translational or torsional movement), the generated forces are in the opposite phase to the speed of the vibration to be suppressed. For a building under construction, the described application can advantageously be carried out in conjunction with Variant 7.

The invention claimed is:

1. A device for vibration control of a structure comprising:
two mass bodies which are respectively rotatably mounted around a first rotational axis and a second rotational axis,
wherein the first rotational axis and the second rotational axis extend in the same direction,
wherein the center of gravity of each mass body has a radius from a respective one of the first rotational axis and the second rotational axis, each radius being a rod that mounts each mass body to a respective one of the first rotational axis and the second rotational axis, each radius being adjustable as a control variable, and
wherein a spacing, a, between the first rotational axis and the second rotational axis is adjustable as a control variable,
a drive configured to set each of the two mass bodies in a circulating rotational motion,
at least one sensor configured to measure a movement or acceleration of the structure, and
a controller configured to control the vibration of the structure connected to the device within the framework of a closed-loop control based on the measured movement or acceleration of the structure by controlling:
the spacing, a, between the first rotational axis and the second rotational axis; and
at least one of following control variables:
a rotational angle, $\phi_1$, $\phi_2$, of the rotational movement of at least one of the two mass bodies, and
said radii by adjusting the length of said rods.

2. The device according to claim 1, wherein there is a further sensor configured to measure an environmental condition.

3. The device according to claim 1, wherein rotational speeds, $\omega_1$, $\omega_2$, of the two mass bodies are numerically identical.

4. The device according to claim 1, wherein the two mass bodies are identical in mass.

5. The device according to claim 1, wherein the radii of the two mass bodies are identical.

6. The device according to claim 1, further comprising a third mass body that is rotatably mounted around one of the first rotational axis and the second rotational axis.

7. The device according to claim 1, wherein the phase relations between the rotational movements of the two mass bodies are control variables.

8. The device according to claim 1, wherein the rotational movements of the two mass bodies go in opposite directions.

9. The device according to claim 8, wherein the spacing between the first rotational axis and the second rotational axis can be adjusted to be coincident.

10. The device according to claim 1, wherein the rotational movements of the two mass bodies run in the same direction.

11. The device according to claim 10, wherein the phase angle between the two rotational movements is always 180°.

12. The device according to claim 1, wherein it is combined with a second device according to claim 1, wherein the first rotational axis and the second rotational axis of each of the first and second devices extend in the same direction.

13. The device according to claim 12, wherein the rotational speeds, ω, of the two mass bodies of the first device and of the two mass bodies of the second device are numerically identical.

14. The device according to claim 12, wherein the two devices have a spacing, b, between them.

15. The device according to claim 14, wherein the spacing, b, between the two devices is a control variable.

16. The device according to claim 12, wherein the spacing, b, between the two devices amounts to zero.

17. The device according to claim 12, wherein the first rotational axis and the second rotational axis of each device can be adjusted to be coincident.

18. The device according to claim 17, further comprising a third device according to claim 1, wherein the first rotational axis and the second rotational axis of each of the three devices can be adjusted to be coincident, the third device comprising a third mass body that is rotatably mounted around the first rotational axis and the second rotational axis of the third device at a same distance from the two other mass bodies of the third device, the third device being interposed between the first and second devices.

19. The device according to claim 12, wherein the phase relations between the rotational movements of the two mass bodies are control variables.

20. The device according to claim 1, wherein multiple devices according to claim 1 are distributed over the structure.

21. The device according to claim 20, wherein the control or feedback control of the individual devices is coordinated.

22. The device according to claim 20, wherein the controls or feedback controls of the individual devices are independent of each other.

* * * * *